May 5, 1964   G. W. GOTTULA   3,131,503
FISHING ROD PROTECTOR
Filed March 10, 1961

INVENTOR.
G. W. GOTTULA
BY

United States Patent Office 3,131,503
Patented May 5, 1964

3,131,503
FISHING ROD PROTECTOR
Gerard W. Gottula, Steinauer, Nebr.
Filed Mar. 10, 1961, Ser. No. 94,781
2 Claims. (Cl. 43—26)

This invention relates to fishing rod containers and more particularly it is an object of this invention to provide a fishing rod protector adapted to fit over the end of a fishing rod of the type having a reel whereby the protector prevents damage to the vulnerable and easily breakable eyelets.

An important object is to provide a protector having means for receiving a hook so that the hook need not be disconencted from the line and is ready for immediate use.

A further object is to provide a protector adapted to effectively prevent an attached hook from snagging the fingers or clothing and further in which the protector has means for receiving and holding the hook so that the line can be drawn taut in a way so as to prevent it from becoming entangled.

A further object is to provide means for quickly attaching this invention to the reel of a rod.

Yet another object is to provide a protector having ventilation openings for the drying of the line in the protector to prevent rotting thereof.

Still another object is to provide a fishing rod protector as described having a resilient member at its inner end against which the terminal eyelet of the rod can be received with a cushioning effect to prevent its damage when the protector is accidentally dropped forward and downward forcibly against a floor, for example, as is the common cause of breakage of the forward eyelet of a rod.

A further object is to provide a protector, the hook receiving portion of which can be formed of a piece of tubing, one end of which is made wider and the other end of which is of smaller diameter and adapted to snugly fit and be attached to a tube forming the main body portion of the protector.

A further object is to provide an overlapping of the tube in the smaller part of the hook receiving portion for providing a ledge on which a hook may be received.

A still further object of this invention is to provide a tubular folding fishing rod protecting casing in which sections of a fishing rod may be stored in which fish hooks of a line trained through eyes of the sections are protected, and wherein said sections are readily removed from the casing and assembled for use.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent priniciples may be used and structural changes may be made as described by those skilled in the art without departing from the present invention and the purview of the appended claims.

Figure 2:
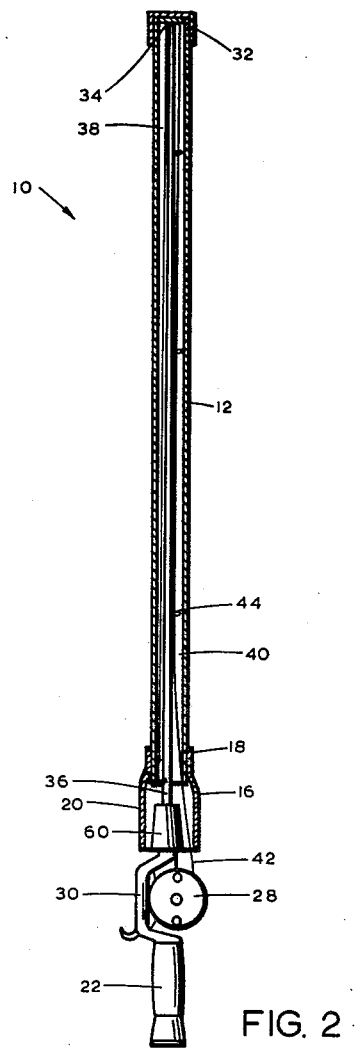
FIGURE 2 is a longitudinal section through the casing of the protector with the parts mounted on a handle, as shown in FIGURE 1.
Figure 1:
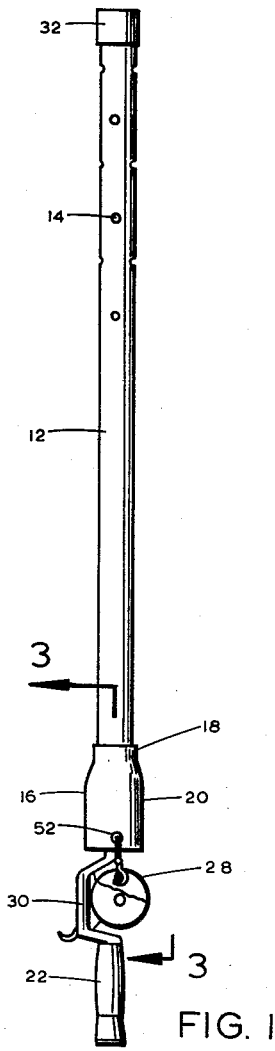
FIGURE 1 is a side elevational view of the improved fishing rod protector showing the casing of the protector on the end of a handle of a fishing rod in which a reel is provided.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a tubular casing providing a housing of the protector and having ventilating perforations 14 therein, numeral 16 indicating a reducing sleeve having a small end 18 fitted on the inner end of the casing 12 and a large end 20 extended over the end of the handle 22, numerals 24 and 26 elastic cords connecting the sleeve to a reel 28 positioned in an offset section 30 of the handle, numeral 32 indicating a cap fitted on the outer end of the casing, and numeral 34 a disc of resilient material positioned in the cap and providing a cushion for protecting an eye on the terminal end of a fishing rod from shock resulting from the protector being dropped whereby the outer end of the casing strikes a hard surface such as a concrete floor.

The combined length of the casing 12 and the sleeve 16 is slightly greater, and the length of the casing 12 alone is slightly smaller than the length of the slender, tubular, flexible, non-handle or base section 36 of a fishing rod, and the casing diameter is such that it will accommodate the base section and its eyelets.

Figure 3:
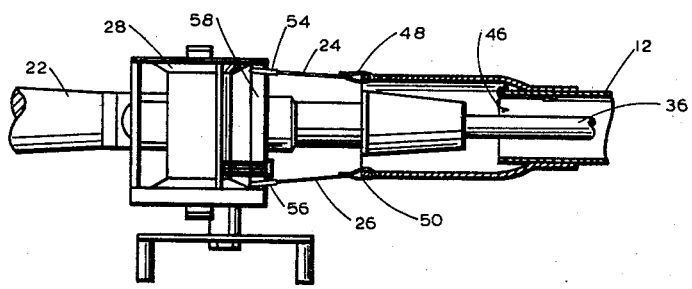
FIGURE 3 is a longitudinal section taken on line 3—3 of FIGURE 1, with the parts shown on an enlarged scale, and showing, in particular the mounting of the protector on the handle of a fishing rod.

Section 38 and 40 of a fishing rod are stored, with the section 36, in the casing 12 and the cap 32 is positioned on the outer end. A fishing line 42 extends from the reel 28 through eyes 44 on the sections of the rod and to a hook 46 which, as shown in FIGURE 3, is hooked over the inner end of the casing 12. The ventilating openings 14 permit circulation of air through the casing for drying the fishing line.

Outer ends of the rubber, or elastic cords, 24 and 26 are provided with loops 48 and 50 that are secured in openings 52 in the large portion 20 of the sleeve 16, and hooks 54 and 56 on inner ends of the cords are secured over a rod 58 of the reel 28.

The large, or base section 36 of a fishing rod is secured to the outer end of the offset section 30 of the handle of a rod by a coupling 60. However, it will be understood that the casing of the protector may be secured to a fishing rod by other suitable means.

Operation

With the parts assembled, as illustrated and described, and with removable sections of a fishing rod retained in the casing 12 by the cap 32, the rod is protected as it is carried to and from the water, or while in storage.

In use it is only necessary to remove the cap 32, which provides access to the sections of the rod, and the sections may be removed and assembled to form the fishing rod.

With the small end of the sleeve 16 secured to the casing 12 at a point spaced from the inner end of the casing a ledge 62 is provided, over which fish hooks may be hooked, as shown in FIGURE 3.

From the foregoing description, it is thought to be obvious that a fishing rod protector constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A fishing rod protector comprising an elongated tubular casing, a sleeve having a small end fitted on the casing and a large end extended from the casing, the end of the casing extended into the sleeve providing a ledge for retaining a fish hook, a fishing rod handle having a reel receiving offset section therein, a reel having a transversely disposed rod therein positioned in the offset section of the handle, elastic cords connecting the sleeve to the rod of the reel, and a closure having a cushion therein on the outer end of the tubular casing.

2. In a fishing rod protector, the combination which comprises an elongated casing having perforations therein, a sleeve mounted on and extended from the inner end of the casing, said sleeve having a small end positioned on the casing and a large end extended from the casing, the end of the casing extending through the small end of the sleeve extending into the large end of the sleeve a sufficient distance to provide an annular fish hook retaining shoulder, elastic cords extended from the large end of the sleeve for connecting the sleeve and casing to a reel of a fishing rod on which the protector is positioned, a cap positioned on the outer end of the casing, and a cushioning disc positioned in the cap.

References Cited in the file of this patent

UNITED STATES PATENTS

| | | |
|---|---|---|
| 764,398 | Upton | July 5, 1904 |
| 1,544,770 | Nathan | July 7, 1925 |
| 1,686,667 | Kaskey | Oct. 9, 1928 |
| 2,040,719 | Walch | May 12, 1936 |
| 2,149,087 | Fisher | Feb. 28, 1939 |
| 2,595,230 | Daviau | May 6, 1952 |
| 2,749,645 | McKern | June 12, 1956 |
| 2,849,825 | Reisner | Sept. 2, 1958 |
| 2,865,128 | Fallert | Dec. 23, 1958 |
| 2,962,187 | Morris | Nov. 29, 1960 |

FOREIGN PATENTS

| | | |
|---|---|---|
| 23,710 | Great Britain | of 1912 |
| 664,887 | Great Britain | Jan. 16, 1952 |